(12) United States Patent
Hanabusa et al.

(10) Patent No.: US 10,637,995 B2
(45) Date of Patent: Apr. 28, 2020

(54) REMOTE ALERT GENERATION BASED ON TRIGGER EVENTS INDICATING ATTACK (71) Applicants: Russell M. Hanabusa, Santa Clara, CA (US); Jennie K. Hanabusa, Santa Clara, CA (US)

(72) Inventors: Russell M. Hanabusa, Santa Clara, CA (US); Jennie K. Hanabusa, Santa Clara, CA (US)

( * ) Notice: Subject to any disclaimer, the term of this patent is extended or adjusted under 35 U.S.C. 154(b) by 0 days.

(21) Appl. No.: 15/789,835

(22) Filed: Oct. 20, 2017

(65) Prior Publication Data
US 2018/0338046 A1 Nov. 22, 2018

Related U.S. Application Data (60) Provisional application No. 62/507,797, filed on May 18, 2017, provisional application No. 62/486,970, (Continued)

(51) Int. Cl.
*H04M 11/04* (2006.01)
*G08B 21/02* (2006.01)
*G08B 25/01* (2006.01)
*G06K 7/10* (2006.01)
*G08B 25/10* (2006.01)
*G08B 13/196* (2006.01)

(52) U.S. Cl.
CPC .......... *H04M 11/045* (2013.01); *G08B 21/02* (2013.01); *G08B 21/0297* (2013.01); *G08B 25/016* (2013.01); *G06K 7/10158* (2013.01); *G08B 13/19695* (2013.01); *G08B 25/10* (2013.01)

(58) Field of Classification Search
None
See application file for complete search history.

(56) References Cited

U.S. PATENT DOCUMENTS 8,249,547 B1 * 8/2012 Fellner ............... G08B 21/0446
455/404.1
8,665,106 B2 * 3/2014 Heidvall ................ G08B 15/00
340/573.1

(Continued)

OTHER PUBLICATIONS https://www.sharperimage.com/si/view/product/All-in-One+Security+Phone/204808?p=plist2470005&utm_source=Google&utm_medium=CPC&utm_campaign=Shopping+PLAs+-+Medium&Keyword=&device=c&creative=71897597063&cm_mmc=CPC-_-Google-_-Shopping+PLAs+-+Medium-_-71897597063&network=g&matchtype=&adpos=1o2&creative=71897597063&mkwid=mu4KIb3W.
https://www.alert-1.com/products/emergency-call-button/640?keyword=%7Bkeyword%7D&utm_source=google&utm_medium=cpc&utm_campaign=Google-Shopping&gclid=CjwKEAjwu4_JBRDpgs2RwsCbt1MSJABOY8anGi0s22B_kDR_qLCZOwAxyyN5D-IDGuDOYEpXU4JHtxoC11Pw_wcB.

*Primary Examiner* — Maria El-Zoobi
(74) *Attorney, Agent, or Firm* — Innovation Counsel LLP (57) ABSTRACT A method and apparatus for detecting a crime is presented. The apparatus includes a Portable Wireless Communications Device having a processor, a memory, a location determination chip, a camera, a microphone, a speaker, a wireless communications circuitry, and a coupling site. The apparatus also includes a connector having a first portion that detachably couples to the coupling site and a second portion that attaches to a person or an item worn by a person, wherein the portable wireless communications device automatically transmits an alert upon sensing a detachment of the connector from the coupling site. When an attack happens, the sudden motion or jerk causes the connector to detach from the coupling site, causing an alert transmission. The alert may be sent to a predesignated phone number or email address so that there is immediate notification of a crime. An alert phrase may be used instead of detachment.

8 Claims, 10 Drawing Sheets

Related U.S. Application Data filed on Apr. 19, 2017, provisional application No. 62/414,659, filed on Oct. 29, 2016, provisional application No. 62/413,430, filed on Oct. 27, 2016.

(56) References Cited

U.S. PATENT DOCUMENTS

| | | | |
|---|---|---|---|
| 9,609,515 B2 | 3/2017 | Tredoux et al. | |
| 2003/0012344 A1* | 1/2003 | Agarwal | H04M 11/04 379/37 |
| 2006/0176660 A1* | 8/2006 | Amiri | G06F 1/1615 361/679.09 |
| 2008/0214142 A1* | 9/2008 | Morin | G08B 25/016 455/404.2 |
| 2013/0234853 A1* | 9/2013 | H. Kazerouni | G08B 13/1427 340/572.1 |
| 2014/0270714 A1* | 9/2014 | Osminer | H04N 21/4131 386/296 |
| 2016/0241807 A1* | 8/2016 | Kovac | H04N 5/77 |
| 2017/0086672 A1* | 3/2017 | Tran | A61B 5/0006 |
| 2017/0237950 A1* | 8/2017 | Araya | G11B 19/02 386/223 |
| 2017/0358191 A1* | 12/2017 | Kechichian | G08B 21/02 |

* cited by examiner

REMOTE ALERT GENERATION BASED ON TRIGGER EVENTS INDICATING ATTACK

CROSS-REFERENCE TO RELATED APPLICATIONS

This application claims the benefit of U.S. Provisional Patent Application Ser. No. 62/413,430 filed on Oct. 27, 2016, U.S. Provisional Patent Application Ser. No. 62/414,659 filed on Oct. 29, 2016, U.S. Provisional Patent Application Ser. No. 62/486,970 filed on Apr. 19, 2017, and U.S. Provisional Patent Application Ser. No. 62/507,797 filed on May 18, 2017, the content of all of which are incorporated herein by reference.

RELATED FIELD

This disclosure relates generally to a method and apparatus for detecting and reporting a crime and more specifically to a method and apparatus for detecting and reporting a crime using a Portable Wireless Communications Device.

BACKGROUND

Crimes such as kidnapping, assault, and rapes have been a problem for many years all over the world. To avoid being caught, criminals who commit these crimes usually launch their attacks in areas that are deserted or dark, or act fast enough that even if they are seen snatching or assaulting someone, there is not enough time for a bystander to take any action. As a result, it often takes a long time—hours, days, or sometimes weeks—for someone to even realize that a crime has been committed. A long time gap between the initial attack and the realization that a crime has occurred makes it difficult to catch the criminals, and contributes to the continual commitment of these crimes by allowing more criminals to go unpunished.

In theory, modern technology such as mobile phones should make it easy for victims to notify others that a crime has occurred. For example, the victim could quickly take a photo of the attacker and send it to a family member or a friend, along with location information and a message like "Help!" However, in practice, this is unlikely because the criminals are usually smart enough to take away the victim's access to his/her phone. In fact, many phones get accidentally dropped or intentionally left behind during the attacks. Furthermore, as the assault or attack is usually a surprise, it is unlikely that the victim will be able to think of using his/her phone to notify others that the attack is happening before the criminal takes the phone away.

A system and method of communicating the occurrence of a crime in a fast and reliable manner is desired.

SUMMARY

In one aspect, the disclosure pertains to an apparatus for detecting a sudden motion. The apparatus includes: a portable wireless communications device having a processor, a memory, a location determination circuitry, a camera, a microphone, a wireless communications circuitry, and a coupling site. A connector has a first portion that detachably couples to the coupling site and a second portion that attaches to a person or an item worn by a person, wherein the portable wireless communications device automatically transmits an alert upon sensing a detachment of the connector from the coupling site.

In another aspect, the disclosure pertains to a computer-implemented method of detecting a crime, the method comprising automatically and immediately transmitting an alert in response to a connector's detachment from a portable wireless communications device, wherein the connector has a first portion attached to a person and a second portion attachable to the portable wireless communications device.

DETAILED DESCRIPTION

This disclosure provides an apparatus and method for sending alerts about a crime almost in real time, along with information that will help catch the criminal. Notably, this instant crime alert system does not necessarily require any deliberate actions of the victim to generate an alert. The inventive concept makes it easier to catch the criminal, therefore acting as a deterrent for violent crimes.

The crime alert apparatus according to one embodiment of the inventive concept has two parts: a portable wireless communications device such as a mobile phone, and a connector that attaches to a person and communicates with the portable wireless communications device. According to another embodiment, the crime alert apparatus is a portable wireless communications device that incorporates an accelerometer and/or a piece of software for recognizing an alert phrase, without a connector.

The connector may be, for example, a string or chord with one end attached to the person's skin or clothing, and another end that detachably couples to a coupling site on the portable wireless communications device. The person would carry the portable wireless communications device by hand, in a pocket, or in a bag while wearing the connector. When an attack happens, as the attack is usually a surprise, there is a sudden motion or a jerk that causes the connector to detach from or stop communicating with the portable wireless communications device. This sudden motion triggers the portable wireless communications device to transmit alerts in a predefined manner such as message(s) and/or phone call(s) to certain phone number(s) and email(s).

Figure 1:
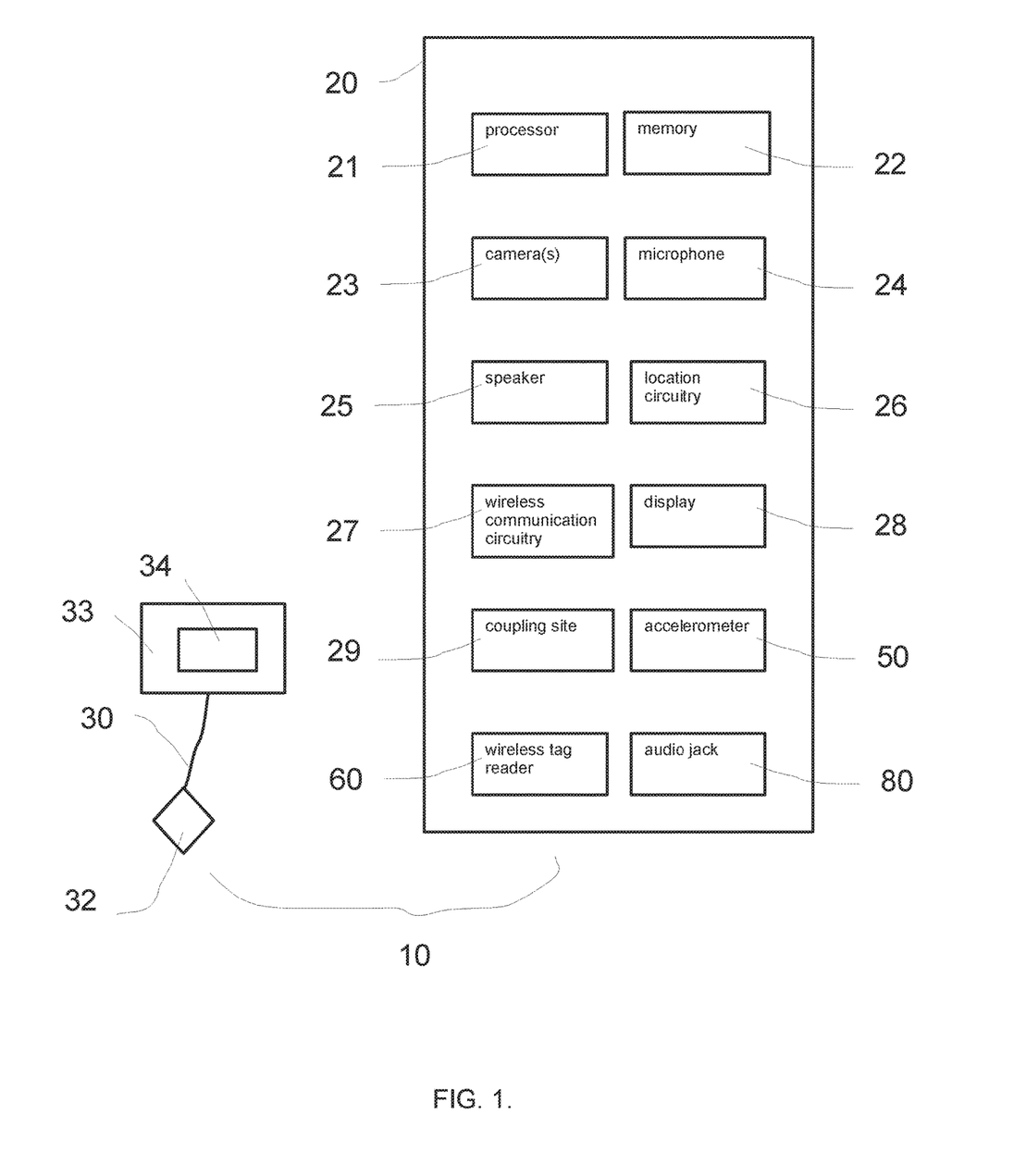
FIG. 1 depicts the crime alert apparatus in accordance with an embodiment of the inventive concept.

FIG. 1 depicts the crime alert apparatus 10 in accordance with one embodiment of the inventive concept. As shown, the crime alert apparatus 10 includes a Portable Wireless Communications Device 20 that may be carried by a person, and a connector 30 that attaches to the person. The Portable Wireless Communications Device 20 has a processor 21 and a memory 22, one or more cameras 23 and a microphone 24 that enable it to record images and sounds, a speaker 25, a GPS circuit 26 to determine the device's location, and a wireless communications circuitry 27. Additionally, some embodiments of the Portable Wireless Communications Device 20 may have a display 28. It should be understood that the GPS circuit 26 may be substituted by any other known methods of determining geographic location.

Additionally, some embodiments of the Portable Wireless Communications Device 20 may have one or more of a coupling site 29, an accelerometer 50, a wireless tag reader 60, and an audio jack 80. The Portable Wireless Communications Device 20 may be, but does not have to be, a mobile phone (e.g., a smart phone). An embodiment that does not include a connector would not include the coupling site 29 that is used for coupling to a connector, or a wireless tag reader 60. The coupling site 29 may be the audio jack 80 in some embodiments. In other embodiments, there may be a wireless tag reader coupling site that is separate from the audio jack 80.

FIG. 1 depicts an embodiment that includes a connector 30 in addition to the Portable Wireless Communications Device 20. The connector 30 that is depicted in FIG. 1 includes a string with one end that attaches to a person's clothing or body, such as a clip 32. The clip 32 may be substituted by a safety pin, a tying mechanism, a buckle, or any other means to securely attach to something that the person is wearing. The other end of the string has a coupling piece 33 that is configured to detachably attach to a coupling site 29 on the Portable Wireless Communications Device 20. The wireless tag 34 is permanently connected to the coupling piece 33. The attachment between the coupling piece 33 and the Portable Wireless Communications Device 20 should be secure enough that the two parts do not spontaneously disconnect while the person is engaging in his/her everyday activities, but weak enough that the coupling site 29 and coupling piece 33 detach when there is a sudden motion that causes a "jerk" on the string 30.

Figure 2A:
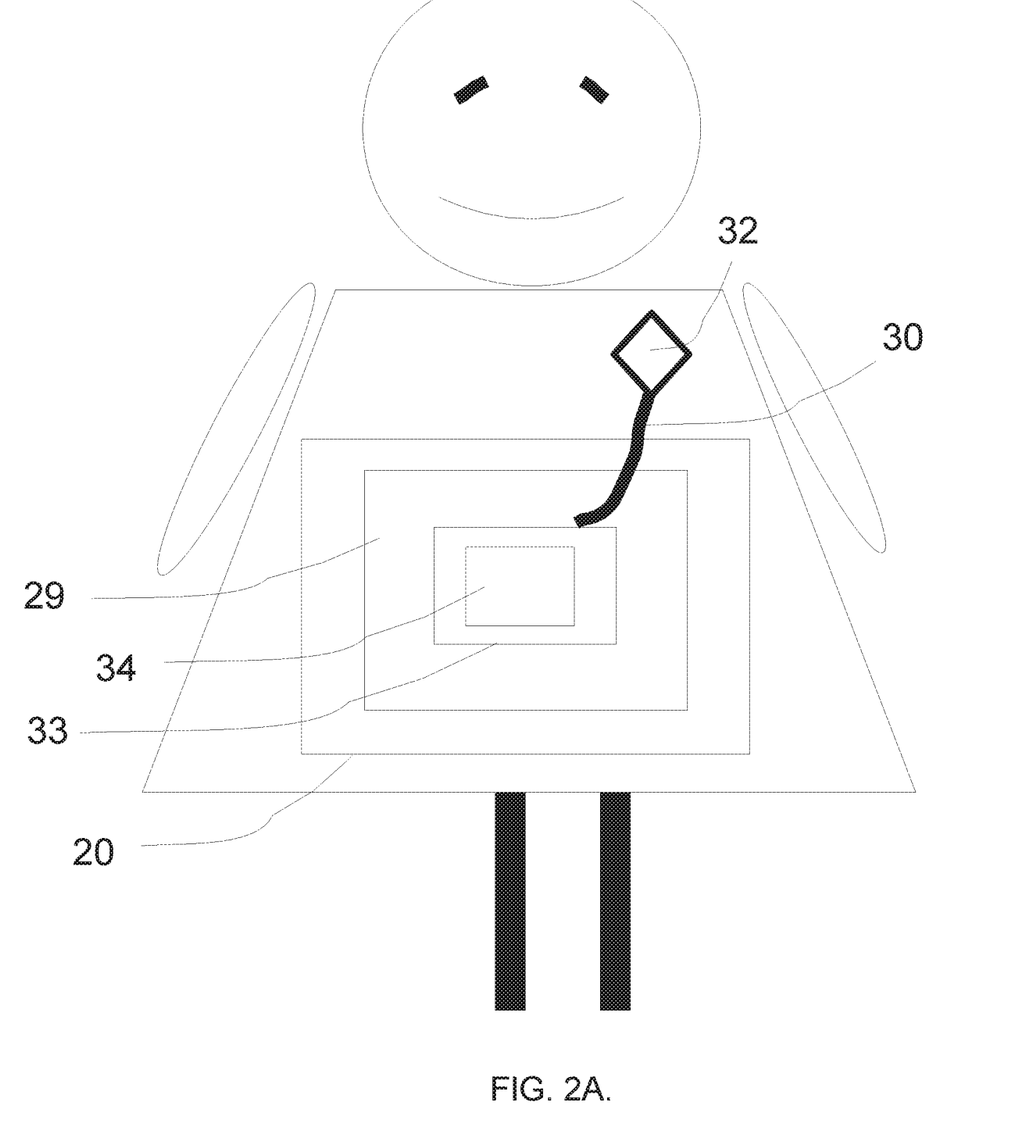
FIG. 2A and FIG. 2B depict an example person wearing a connector and carrying the portable wireless communications device prior to an attack and after an attack, respectively.

FIG. 2A depicts a person wearing the connector 30 and carrying the Portable Wireless Communications Device 20 before an attack. The connector 30 (which in this case is a string) is relaxed with the coupling piece 33 attached to the coupling site 29 on Portable Wireless Communications Device 20. The wireless tag 34 is permanently attached to coupling piece 33. The clip 32 strongly holds one end of the connector 30 to the person's clothing.

Figure 2B:
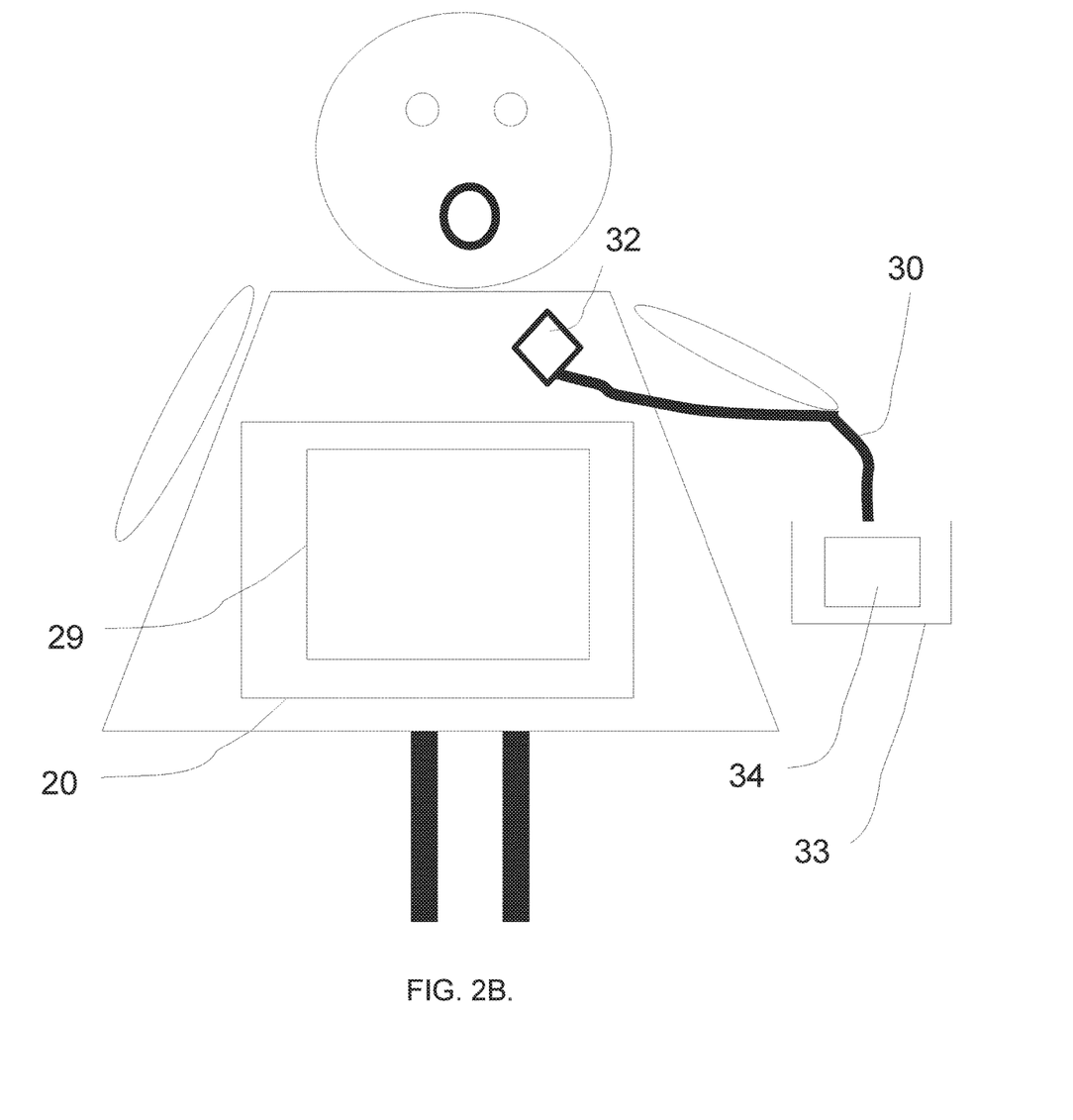

FIG. 2B depicts the state after an attack, and shows that the coupling piece 33 and the coupling site 29 are separated. This detachment could have been caused by a jerk on the string 30 during the attack by the victim or the criminal either intended or unintended. As will be described in more detail below, this detachment is a "triggering event" that causes an automatic transmission of crime alerts by the Portable Wireless Communications Device 20.

Figure 3:
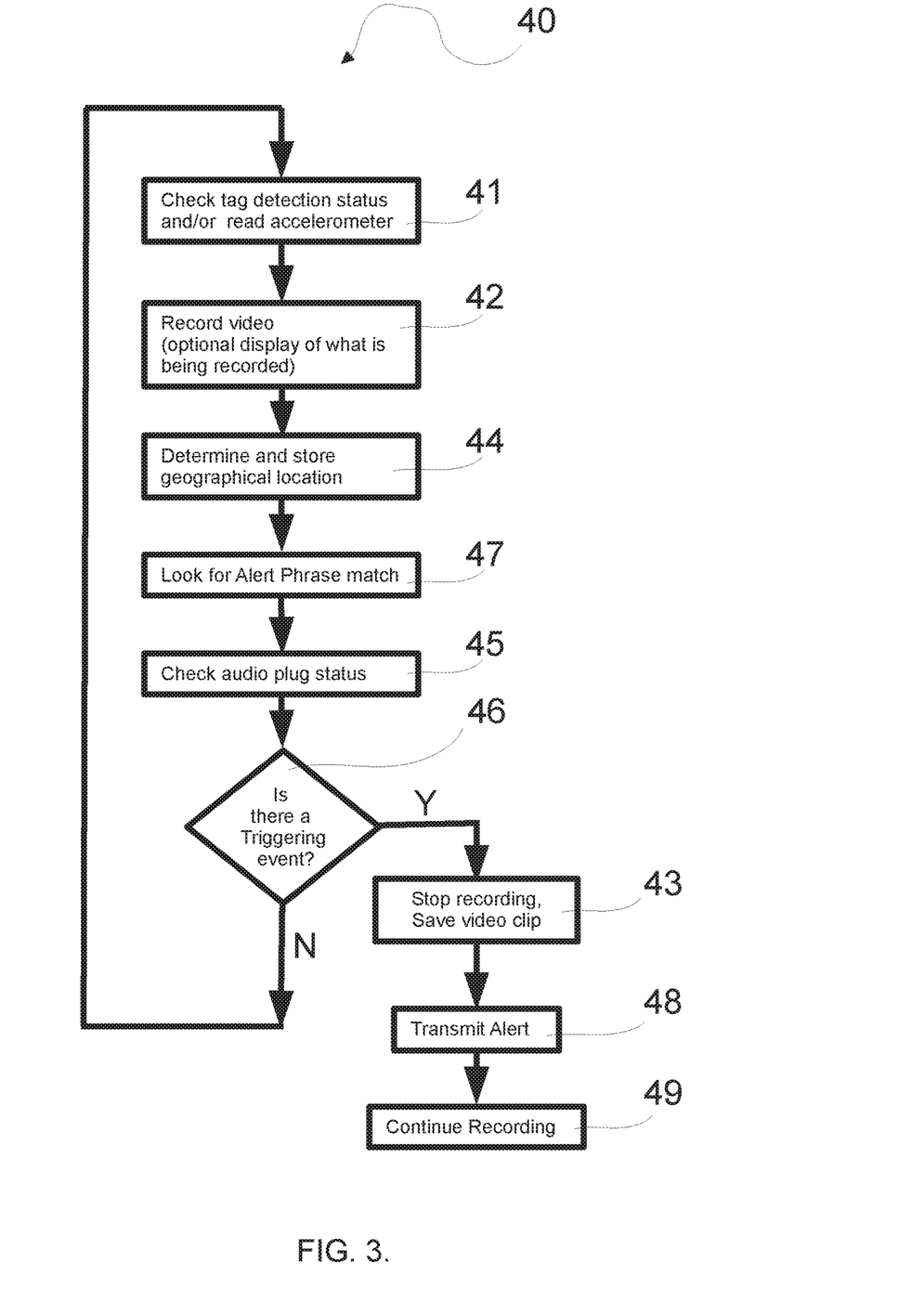
FIG. 3 is a flowchart depicting the crime detection process executed by the portable wireless communications device in accordance with an embodiment.

FIG. 3 is a flowchart depicting the automatic crime detection process 40 executed by the Portable Wireless Communications Device 20. As shown, the process 40 is composed of a main loop of many sub-processes which branch to a sub-process 48. The automatic crime detection process 40 includes the following sub-processes:

Check if wireless tag detection has changed or a jerk exceeding a predefined magnitude is detected (sub-process 41).

Record short video clips and optionally, display what is being recorded (sub-process 42). The recorded video could be made using multiple cameras of a Portable Wireless Communications Device 20. For example, the front and back cameras of a mobile phone could simultaneous be used to record a picture-in-picture video recording.

Determine and store geographical location (sub-process 44).

Check if audio plug 97 is inserted into audio jack 80 (sub-process 45).

Look for a match in spoken words to the predefined Alert Phrase (sub-process 47).

Check if any triggering event has occurred (sub-process 46).

If triggering event is detected in sub-process 46, stop recording immediately and save the video clip (sub-process 43).

Immediately transmit alert to prestored number(s) and email address(es). Alert may include the saved video clip, which is a recording of the last x seconds (e.g., 10 seconds) right up to the moment of the triggering event. Alert may also include turning on speaker phone and calling predefined phone number(s) (sub-process 48).

Record post-attack video for a preset time duration (sub-process 49).

If there is no triggering event detected in sub-process 46, repeat the loop.

The Portable Wireless Communications Device 20 records videos of its surroundings (sub-process 42) using the camera 23. The video recordings may include images and sounds, and short video clips of a predefined length (for example 10 seconds). The loop in the automatic crime detection process 40 may repeat at a preselected time interval. If the loop is set to repeat every 0.1 seconds, it will be checked every 0.1 seconds whether a triggering event has been detected because sub-process 46 will happen every 0.1 seconds. The video clip that is recorded in sub-process 42 may be longer than the interval at which the loop repeats—for example, the video clip may be 10 seconds long. In this case, the recording that is maintained will be a clip of the most recent full 10 seconds video recording, which will be updated to the "new" most recent 10 seconds every time the loop repeats.

The stored short video clips are continuously updated as the automatic crime detection process 40 repeats the loop, so that there will always be a video of the time just before a triggering event that is available for immediate transmission upon the triggering event. When a triggering event is detected in sub-process 46 the current video recording in progress is immediately stopped and saved. This video file is immediately transmitted as part of the alert in sub-process 48. Optionally, other pre-trigger video files could also be transmitted too. This stopping of recording and immediate transmission assures that at least 10 seconds of pre-trigger video up to the triggering event is transmitted as quickly as possible. The post-trigger video will be 10 seconds long. Likewise, the geographical location of the phone is updated and available for immediate transmission upon a triggering event. "Immediate," as used herein, means in less than a few seconds, and in some cases in less than one second, of the triggering event happening.

The method of automatic crime detection process 40 minimizes the use of expensive wireless data transmissions by locally recording and storing pre-trigger event video and only transmitting these video files when triggered to. This eliminates the need and expense of continuously transmitting video wirelessly to transmit the few seconds just prior to the triggering event.

Optionally, the video that is being recorded may be displayed. The Portable Wireless Communications Device 20 also determines its geographic location in sub-process 44, for example by using the GPS circuitry or calculating location using the position of cell phone towers. If a triggering event is detected in the sub-process 46, the video clip and the GPS coordinates are automatically and immediately transmitted to predesignated number(s) and email(s) in sub-process 48. After the triggering event is detected, more video is recorded and transmitted, the speaker phone is turned on, and phone call(s) are made to predesignated number(s). These predesignated numbers may be the phone number(s) of a family member, a friend, or a law enforcement unit. The video clips should provide at least clues, if not direct information, about how the crime is committed and by whom. The crime detection process 40 may repeat in a loop as long as the Portable Wireless Communications Device 20 is powered.

In some embodiments, the video recording may continue in sub-process 49 after the alert is generated in sub-process 48. This post-trigger recording may be limited to a preset length, for example 15 seconds. The post-trigger recording may provide additional information that is helpful for catching the criminal or determining what happened at the crime scene.

Generating the alert during sub-process 48 may include various steps, such as sending text message(s) and email(s) which include the victim's phone/device location, transmitting pre-trigger video clip(s) and/or picture(s), making new post-trigger video clip(s) and transmitting them (sub-process 49), making phone calls to predefined number(s), and turning on the speaker phone.

Figure 4:
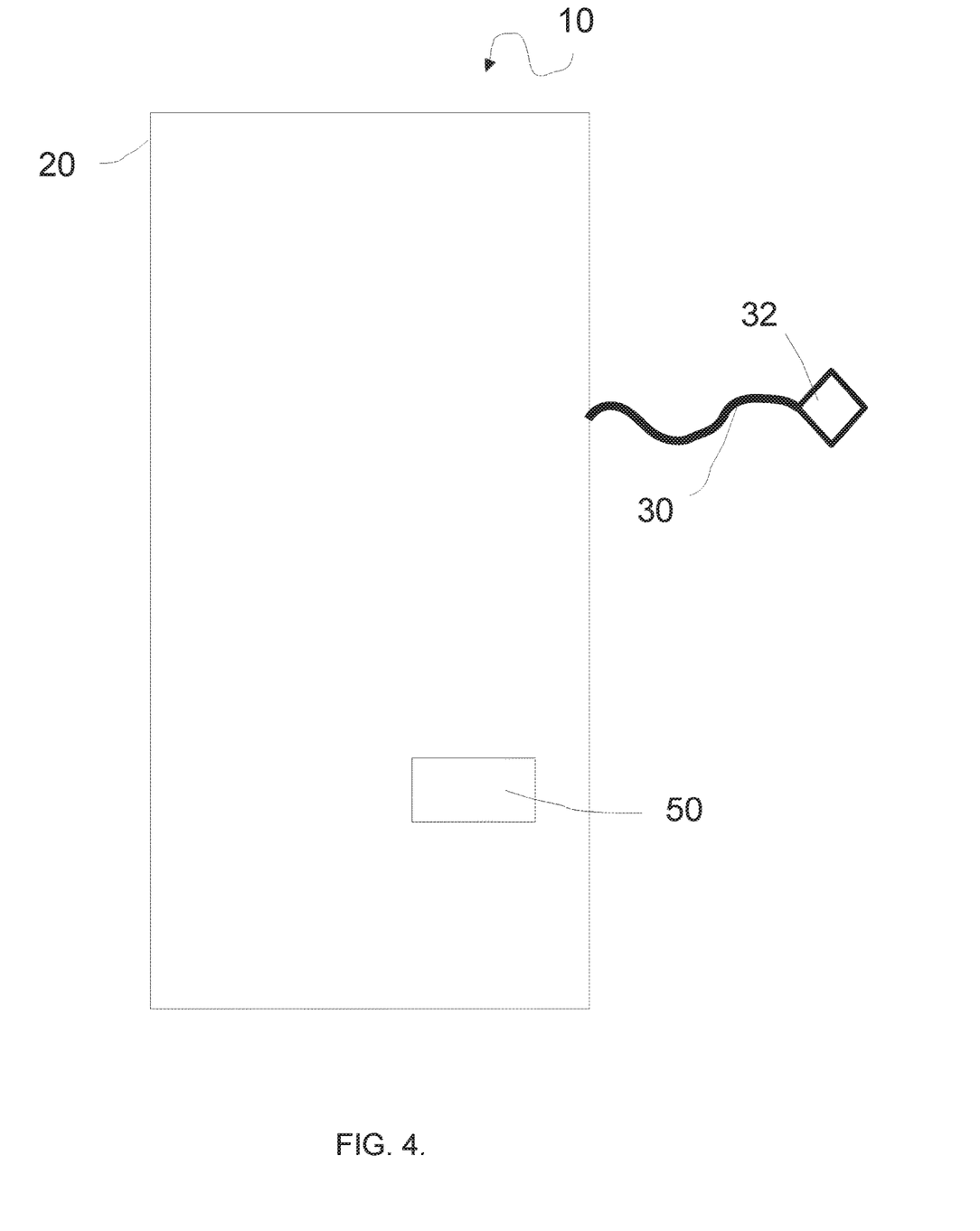
FIG. 4 depicts an embodiment of the crime alert apparatus wherein the triggering event is a sudden movement, in accordance with the inventive concept.

FIGS. 4, 5A, 5B, 5C, 6A, 6B, and 6C depict example embodiments of the apparatus in accordance with various embodiments of the inventive concept. In FIG. 4, the triggering event is a jerk or a sudden movement detected by an accelerometer 50 in the Portable Wireless Communications Device 20. The embodiment of FIG. 4 may be used with a connector 30 or without the connector 30. The connector 30, like a string or chord, may be strongly attached or even tied to the Portable Wireless Communications Device 20 such that it helps transmit a "jerk" to the Portable Wireless Communications Device 20. When there is an attack any strong jerk(s) on the string 30 are transmitted by the string 30 to the body of Portable Wireless Communications Device 20. The accelerometer 50 in the Portable Wireless Communications Device 20 registers the magnitude of these jerk(s). If the jerk(s) are great enough then in sub-process 48 the alert is sent. When this triggering method is used without the connector 30, the accelerometer 50 works just as mentioned above but without the connector 30 helping to transmit the force of a struggle to the accelerometer 50.

The Portable Wireless Communications Device 20 may detect jerks on the string attached to it by using one or more of the following: a mechanical switch, an optical switch, a magnetic switch, an accelerometer, a mechanical flex detector, an electronic flex detector, stress detector, and a wireless tag reader.

The use of the connector 30 increases the efficiency of the Portable Wireless Communications Device for detecting an attack. The connector 30 may be draped across a user's body increasing the detection area for any physical abuse. The connector 30 more effectively transfers the force of this physical abuse to the Portable Wireless Communications Device to become a triggering event.

Figure 5A:
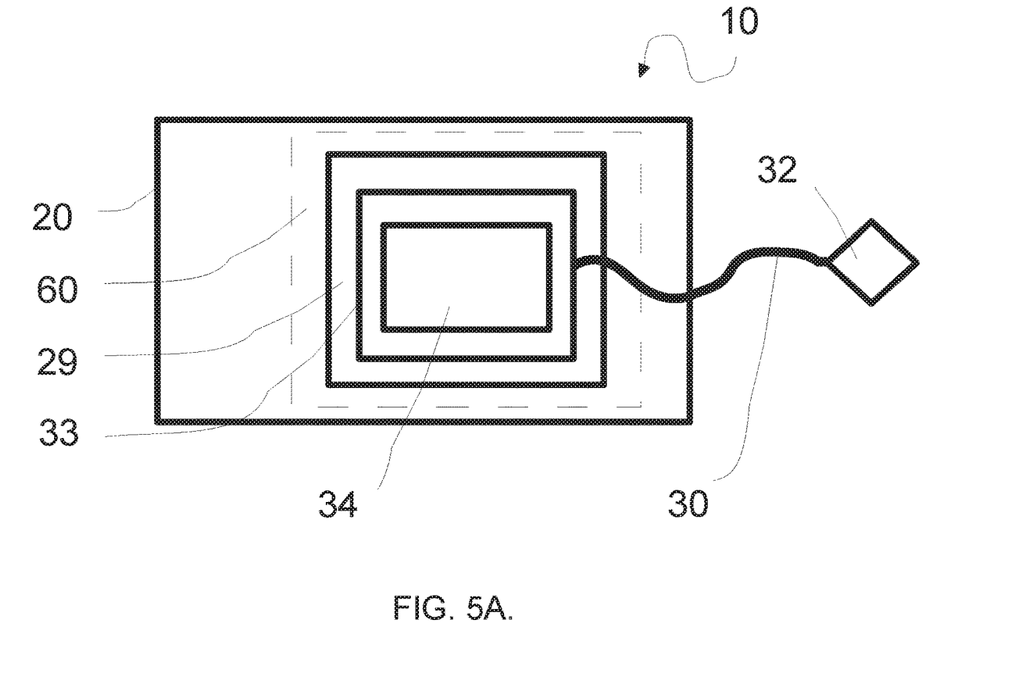
FIG. 5A, FIG. 5B, and FIG. 5C depict an embodiment of the crime alert apparatus wherein the triggering event is loss of the portable wireless communications device's detection of a wireless tag.

FIG. 5A depicts a back view of the crime alert apparatus 10 in accordance with one embodiment. In the embodiment of FIG. 5A, the triggering event is the detachment of a wireless tag 34 from the Portable Wireless Communications Device 20. The connector 30 has one end 32 clipped to the person's clothing, and a coupling piece 33 at the other end with a wireless tag 34 attached to coupling piece 33. The Portable Wireless Communications Device 20 has a coupling site 29 and a wireless tag reader 60. When coupling site 29 and the coupling piece 33 are attached, the wireless tag reader 60 can detect the wireless tag 34. Many mobile phones available in the market today come with a wireless tag readers 60. The coupling site 29 and the coupling piece 33 can be implemented using Velcro® like dry adhesives, a sticky surface, a magnetic surface, a mechanism, etc. The strength of the attachment between the coupling site 29 and the coupling piece 33 is weaker than that between the other components. Hence, when an attack happens, a strong enough "jerk" on the connector 30 would cause the coupling piece 33 to detach from the coupling site 29. This moves the wireless tag 34 out of the detection range of the wireless tag reader 60, the wireless tag reader 60 would lose detection of the wireless tag 34, and this change in detection status would be detected in sub-process 41 and be recognized as a triggering event in the sub-process 46. Then the alerts are transmitted in sub-process 48.

Figure 5B:
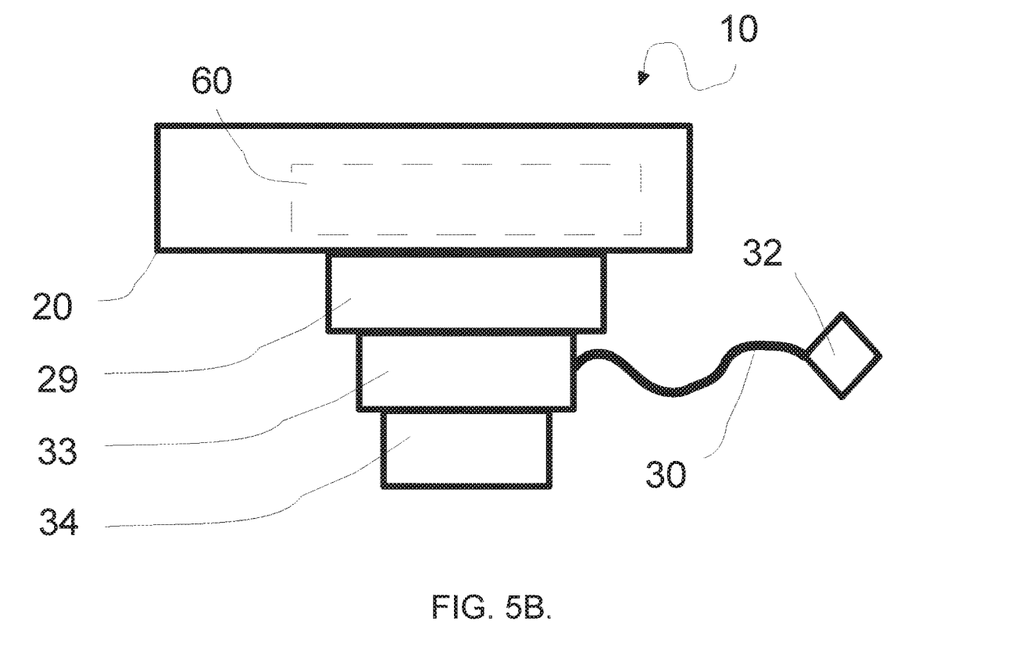

FIG. 5B depicts a side view of the crime alert apparatus 10 in accordance with one embodiment. FIG. 5B shows a Portable Wireless Communications Device 20 with wireless tag reader 60, a coupling site 29, and matching coupling piece 33, and a wireless tag 34. The coupling site 33 is securely attached to the connector 30. Coupling site 29 and the coupling piece 33 place the wireless tag 34 so that the wireless tag reader 60 can successfully detect the wireless tag 34.

Figure 5C:
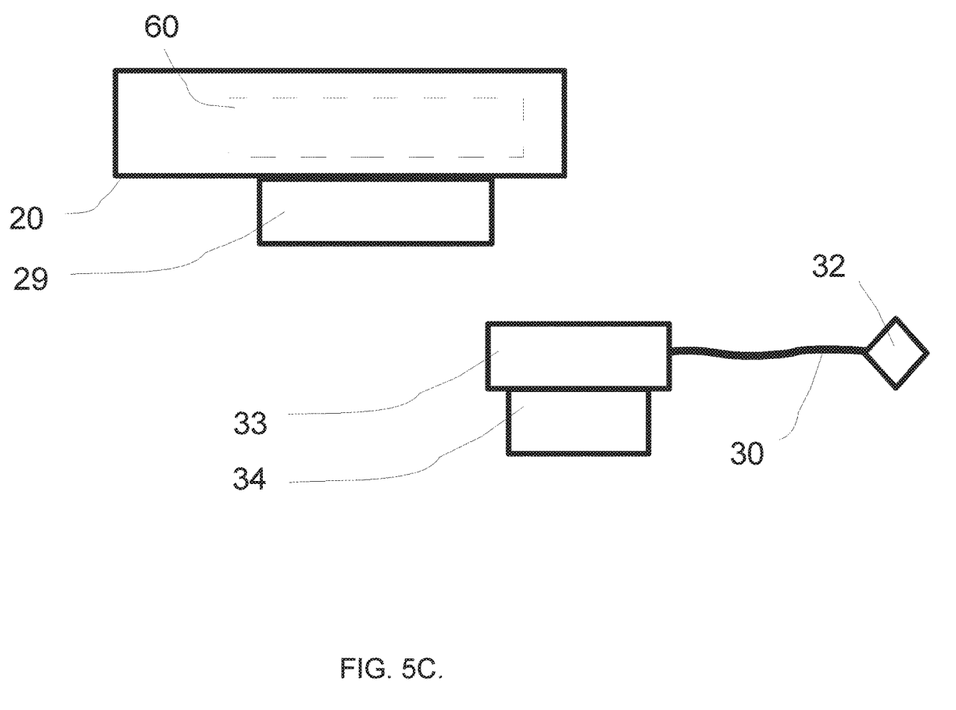

FIG. 5C depicts a side view of a Portable Wireless Communications Device 20 with the wireless tag 34 detached or pulled away. The wireless tag reader 60 loses detection of the wireless tag 34. This loss of detection is detected in sub-process 41. This becomes recognized as a triggering event in sub-process 46 and the alerts are transmitted in sub-process 48.

Figure 6A:
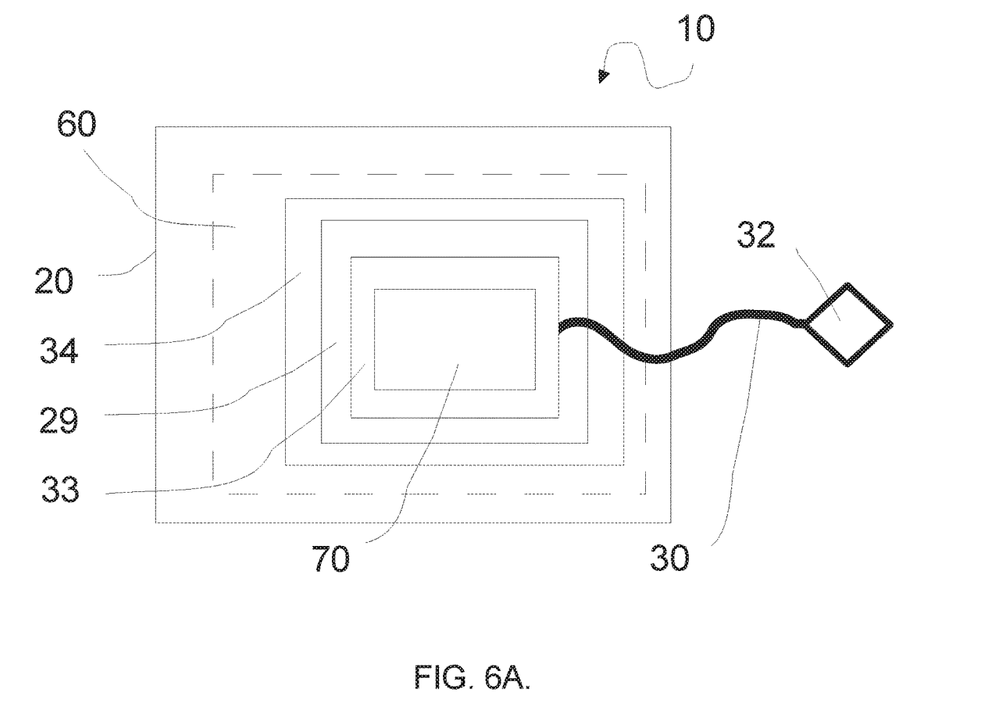
FIG. 6A, FIG. 6B, and FIG. 6C depict an embodiment of the crime alert apparatus wherein the triggering event is the gain of the portable wireless communications device's detection of a wireless tag.

FIG. 6A depicts a back view of the crime alert apparatus 10 in accordance with another embodiment of the inventive concept. Referring to FIG. 6A, the connector 30 has one end 32 attached to the person's clothing and a wireless tag shield 70 at the other end 33 as the coupling piece 33. The Portable Wireless Communications Device 20 has a wireless tag reader 60, the wireless tag 34 is securely attached to the Portable Wireless Communications Device 20. There is a coupling site 29 which is securely attached to the wireless tag 34. The coupling piece 33 attaches to coupling site 29. A wireless metal shield 70 is securely attached to the coupling piece 33. The coupling piece 33 is, in turn, securely attached to the connector 30 (e.g., a string). The attachment 32 for clothing or the human body is also securely attached to the connector 30. The strength of the attachment between the coupling sites 29 and the coupling piece 33 are weaker than those between any other components. When the coupling piece 33 is attached to the coupling site 29, the wireless tag shield 70 is close enough to the wireless tag 34 to prevent the wireless tag reader 60 from detecting the presence of the wireless tag 34.

When the wireless tag shield 70 is within a predefined distance from the wireless tag 34, it prevents any detection of the wireless tag 34 by the wireless tag reader 60. Hence, under normal conditions, while the Portable Wireless Communications Device 20 is searching for wireless tag 34, it would be unable to detect the presence of the wireless tag 34 due to the close presence of the wireless tag shield 70. When an attack happens and the connector 30 is subjected to a jerk which pulls the wireless tag shield 70 away from the wireless tag 34, the wireless tag reader 60 gains detection of the wireless tags 34. This change in detection status is noted in sub-process 41 and recognized as a triggering event in sub-process 46. Then the alerts are transmitted in process 48.

Figure 6B:
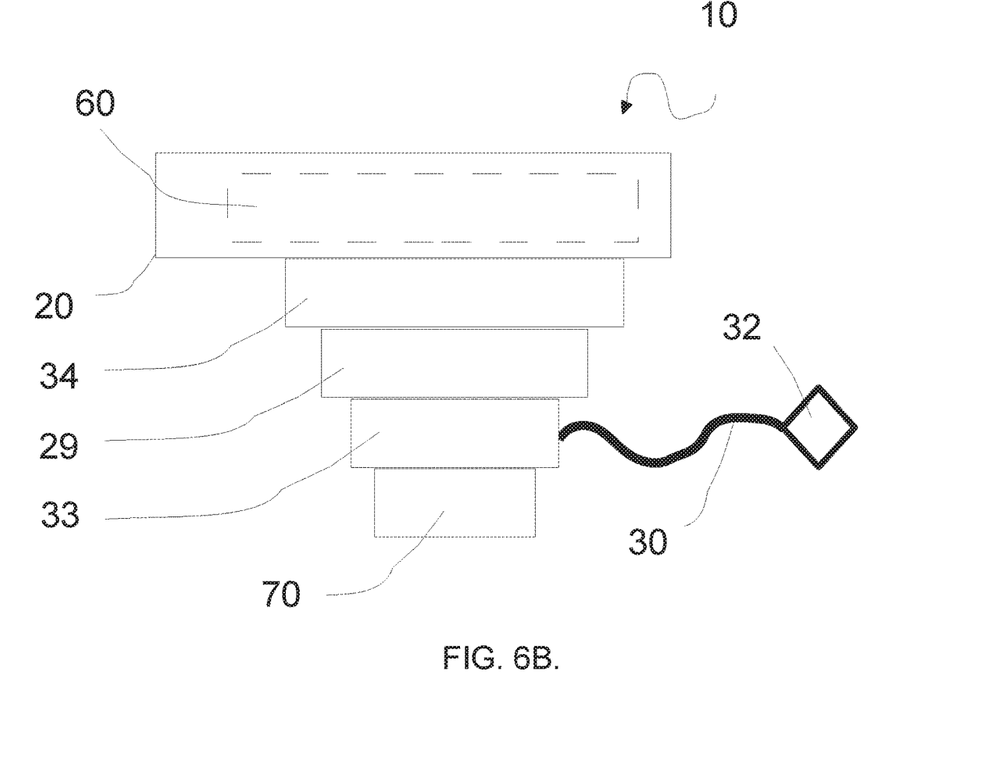

FIG. 6B depicts the side view of an embodiment of the crime alert apparatus 10 where the wireless tag shield 70 is positioned to interfere with the detection of the wireless tag 34 by the wireless tag reader 60. This interference can be achieved by just having the wireless tag shield 70 close enough to either the wireless tag 34 or the wireless tag reader 60. It is not required that the wireless tag shield 70 be between the wireless tag 34 and the wireless tag reader 60. The wireless tag shield 70 only needs to be close enough to prevent wireless tag 34 detection. The wireless tag shield 70 may be metal foil, solid metal, water, among other materials that interfere with wireless signals.

Figure 6C:
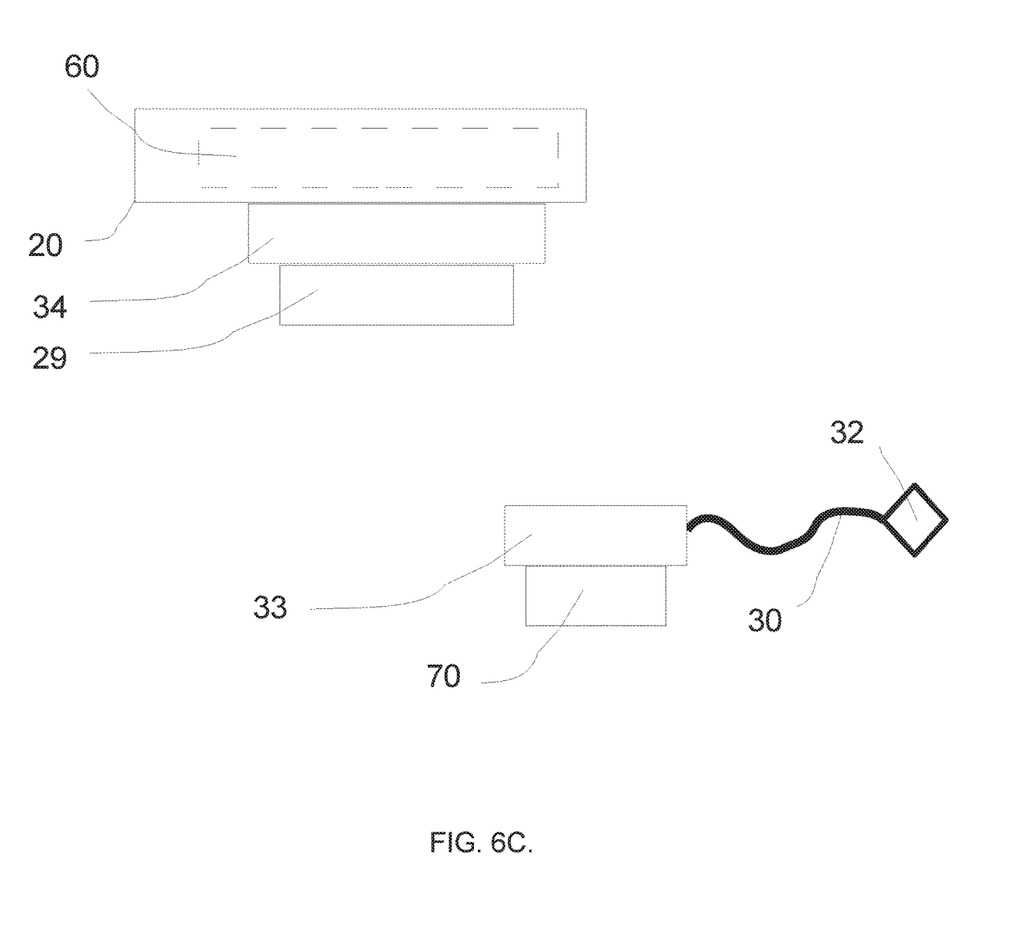

FIG. 6C depicts the side view of an embodiment of the crime alert apparatus 10 where the wireless tag shield 70 has been separated from the wireless tag 34. With the wireless tag shield 70 out of the predefined distance range, the wireless tag reader 60 can detect the wireless tag 34. This change in detection status registers as a triggering event in sub-process 46 and results in alert transmission in sub-process 48.

Figure 7A:
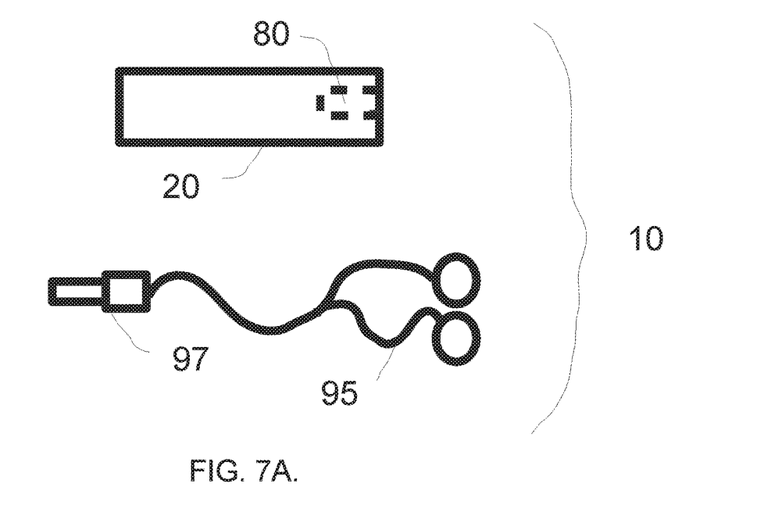
FIG. 7A, FIG. 7B, and FIG. 7C depict an embodiment of the crime alert apparatus wherein the triggering event is the detachment of an audio cable plug from a Portable Wireless Communications Device's audio cable jack.
Figure 7B:
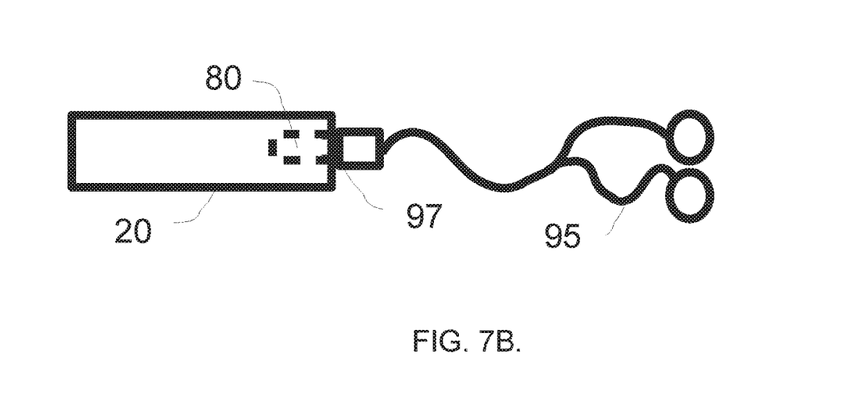
Figure 7C:
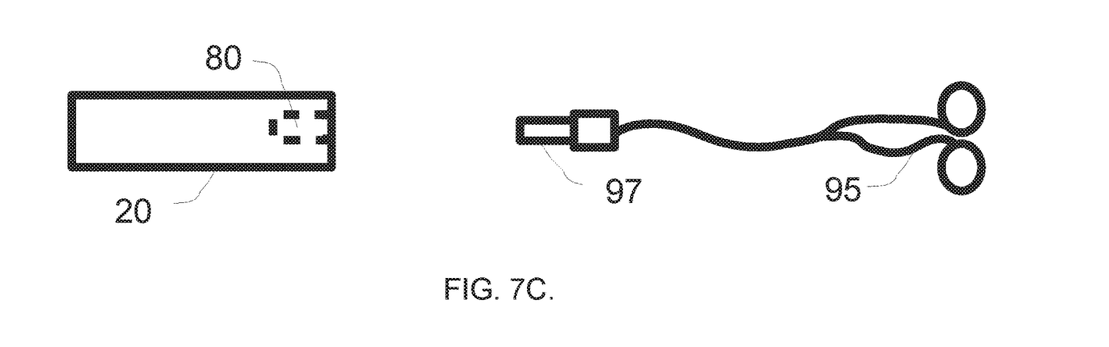

The embodiments of FIG. 7A, FIG. 7B, and FIG. 7C show an embodiment of a crime alert apparatus 10 in which the triggering event is an improper detachment/disconnection of an audio plug from the Portable Wireless Communications Device 20. FIG. 7A depicts a common ear bud assembly 95 with the ear bud audio jack 97. In this embodiment, the coupling piece 33 corresponds to the audio plug 97, the clip 32 corresponds to ear buds 95, and the coupling site 29 corresponds to the audio jack 80. When an attack happens, the "jerk" would yank the ear bud audio plug 97 from the audio jack 80. This disconnection of the audio plug 97 acts as a triggering event in sub-process 46.

Simply treating the removal of the ear bud assembly 95 from the audio jack 80 as a triggering event may result in a false alarm, as users may put away their ear bud assembly 95 for a number of reasons. To prevent false alarms, the portable wireless communications device 20 would be configured such that when the user removes the ear buds 95 from the audio jack 80 "properly," under normal circumstances (no attack), the user would have to take an extra step to prevent the removal from triggering an alert. The extra step may be to push a hard button or a soft button to safely remove the ear bud assembly 95, perform a double-removal where the ear buds are pulled out, re-inserted, then pulled out again quickly, or to speak a predetermined disabling phrase that will temporarily prevent the disconnection of the ear buds from triggering an alert. Improper disconnection of the ear buds 95—or removal of the ear buds 95 from the audio jack 80 without the extra step—would be treated as a "triggering event" in sub-process 46 only if none of these extra steps is taken to let the device 20 know that the ear bud disconnection is intended and not due to an attack.

The audio jack feature may be used in place of the wireless tag feature described above, or it may be used in conjunction with the wireless tag embodiments (described referring to FIG. 5A and FIG. 6A) or the accelerometer embodiment (described referring to FIG. 4). FIG. 7B depicts the side view of an embodiment where the ear bud audio plug 97 is inserted into the audio jack 80 of the Portable Wireless Communications Device 20. The automatic crime detection process 40 will regard the removal of the audio plug 97 as a triggering event in sub-process 46. FIG. 7C depicts the side view of an embodiment where the ear bud audio plug 97 has been jerked out of the audio jack 80 and the sub-process 46 recognized this as a triggering event. Then the alerts are transmitted in sub-process 48.

Even when the coupling site 29 includes an audio jack 80, the other end of the connector is not limited to being a speaker assembly such as ear buds or a headphone. For example, the connector 30 may include a coupling piece 33 that is shaped like an audio plug 97 so it fits into the audio jack 80, but have a clip 32 that attaches to a person's clothing instead of a speaker set.

The embodiments of FIG. 4, FIG. 5A, FIG. 6A, and FIG. 7A are not necessarily mutually exclusive and their features may be used in combination to increase the effectiveness of the crime detection process 40. For example, an embodiment could have both the accelerometer (and G-force-detecting circuitry) with a wireless tag reader 60 at the coupling site 29. As another example, a Portable Wireless Communications Device 20 may have both a coupling site 29 and a separate audio jack 80.

Wireless tags come in many types and have different industrial standards. Some examples include Near Field Communications (NFC) wireless tags, Ultra-High Frequency (UHF) wireless tags, Low-Frequency (LF or Low-FID) wireless tags, and HighFID (HF) wireless tags. Using a short range wireless tag such as NFC wireless tags may allow the triggering event to be detected faster than using a long-range wireless tag like an Ultra-High Frequency wireless tags.

The automatic crime detection process 40 may be shut down or deactivated manually by a user. This shut-down may be done as part of the power-off process for the Portable Wireless Communications Device 20 or independently so that just the automatic crime detection process 40 is deactivated and the Device 20 remains powered on. If the user deactivates the automatic crime detection process 40, all the video clips that were created and saved while it was active gets deleted automatically. This automatic video deletion ensures that there is no video being shared unless there is an attack, thereby preventing any concerns of privacy violations that may stem from videos of random people being stored. With the automatic deletion feature, the video will be shared only if there is an attack (a triggering event) while the automatic crime detection process 40 is active.

The crime detection process 40 uses the wireless tag reading technology in a novel manner. Usually, a wireless tag reader 60 reads a wireless tag only briefly. An example of a typical wireless tag use is taking inventory in a store. Each item in the store would have its own wireless tag with a unique identification number. The store clerk would move a wireless tag reader from item to item to electronically log the items. This requires fully reading the identification number of each item as part of the inventory process. In contrast to this in the crime detection process 40, the wireless tag reader 60 only needs to determine if wireless tag 34 can be detected. There is no need to fully read the wireless tag's identification number.

Another way in which the crime detection process 40 uses wireless tag reader 60 in an unconventional way is that the same wireless tag 34 is read for a long time repeatedly. For example, the Portable Wireless Communications Device 20 can read the wireless tag 34 repeatedly for hours at a time for as long as the Portable Wireless Communications Device 20 has power. For common wireless tag uses such as taking inventory the wireless tag reader is moved to different wireless tags every few seconds.

With the crime alert apparatus 10 and the automatic crime detection process 40, the victim does not need to touch the Portable Wireless Communications Device 20 directly or remember to take any specific actions upon being assaulted to generate an alert. The inventive concept stems from the fact that a sudden, jerking motion or a struggle that naturally happens with an assault can generate a crime alert. By using a natural movement to trigger an alert, the method and apparatus described herein will be effective regardless of age, gender, and mental and physical capability levels of the victims. Even if the victim is a naive child, the violence of the criminal's own actions alone could result in determination of a triggering event in sub-process 46 and generate alerts in sub-process 48.

The following triggering events can prompt sub-process 46 to start the transmission of alerts in sub-process 48:

Triggering Event #1: The victim speaks a predefined Alert Phrase which is recognized by speech to text translation software residing in the Portable Wireless Communications Device 20 in sub-process 47. In this case the victim would have to deliberately speak a predefined Alert Phrase. An example of an Alert Phrase is "Help, Help, Help".

Triggering Event #2: The audio plug 97 is pulled out of the audio jack 80 in an improper manner which does not invoke the disabling of it as a triggering event.

Triggering Event #3: The accelerometer 50 detects an accelerometer measurement so severe (above a predefined magnitude). This can be accomplished either with or without the use of the connector 30;

Triggering Event #4: The detection status of the wireless tag 34 change from with detected to un-detected, or un-detected to detected by the wireless tag reader 60.

This invention does not require that any given Portable Wireless Communications Device 20 has all of the detection devices and features mentioned in this document nor need it implement all of the capabilities of this invention. A given Portable Wireless Communications Device 20 might implement only a subset of these capabilities.

The program for this inventor could be run either visibly on the screen of the Portable Wireless Communications Device or in the background and not visible on the screen. The program would run simultaneously with other programs of the Portable Wireless Communications Device.

It should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. An apparatus for detecting a crime, comprising:
    a Portable Wireless Communications Device having a processor, a memory, a location determination chip, a camera, a microphone, a speaker, a wireless communications circuitry, and an audio jack; and
    assembly having an audio plug that detachably couples with the audio jack, wherein the portable wireless communications device automatically stops recording and transmits an alert with the latest video clip upon sensing disconnection of the audio plug from the audio jack.

2. The apparatus of claim 1, wherein the portable wireless communications device has a display.

3. The computer-implemented method of claim 1, wherein the alert is transmitted within one second of detecting the disconnection.

4. The method of claim 1, wherein the Portable Wireless Communications Device is configured to record images and sounds for a predefined number of seconds in a continuous loop for transmission with the alert.

5. The method of claim 4, wherein the Portable Wireless Communications Device is configured to automatically delete any stored video and audio recordings upon deactivation of the method.

6. The computer-implemented method of claim 1, wherein the first portion comprises an audio plug that couples with an audio jack of the Portable Wireless Communications Device, and wherein the disconnection comprises an improper detachment of the audio plug from the audio jack.

7. The computer-implemented method of claim 1, wherein the Portable Wireless Communication Device, upon detecting a triggering event, records a video of a predefined length and transmits the video via wireless communications circuitry to one or more predefined phone numbers.

8. The computer-implement method of claim 1, wherein the Portable Wireless Communication Device, upon detecting a triggering event, turns on a speaker phone function and makes one or more phone calls to predefined phone numbers.

* * * * *